(12) United States Patent
Morooka

(10) Patent No.: US 9,007,625 B2
(45) Date of Patent: Apr. 14, 2015

(54) INFORMATION PROCESSING APPARATUS, INFORMATION PROCESSING METHOD, PROGRAM, AND INFORMATION PROCESSING SYSTEM

(75) Inventor: Hidekazu Morooka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/286,566

(22) Filed: Nov. 1, 2011

(65) Prior Publication Data
US 2012/0105912 A1    May 3, 2012

(30) Foreign Application Priority Data

Nov. 2, 2010    (JP) .................................. 2010-246392

(51) Int. Cl.
G06F 3/12    (2006.01)
(52) U.S. Cl.
CPC ............ G06F 3/1285 (2013.01); G06F 3/1205 (2013.01); G06F 3/1243 (2013.01); G06F 3/127 (2013.01)
(58) Field of Classification Search
CPC combination set(s) only.
See application file for complete search history.

(56) References Cited

U.S. PATENT DOCUMENTS

2008/0106755 A1*  5/2008  Morooka ................... 358/1.15
2008/0304102 A1* 12/2008  Saito ........................ 358/1.15

FOREIGN PATENT DOCUMENTS

JP    2004-185489 A    7/2004

* cited by examiner

*Primary Examiner* — Fred Guillermety
*Assistant Examiner* — Idowu O Osifade
(74) *Attorney, Agent, or Firm* — Carter, DeLuca, Farrell & Schmidt, LLP

(57) ABSTRACT

An information processing apparatus transmits a print job to a printer after performing print setting processing for variable print data. An operation information setting unit receives print setting information in which the leading page of each of the records is specified as the first page for a page or a page range in each of the records to perform print setting. A job ticket generation unit sets print setting information to a job ticket in accordance with the instruction which a hot folder manager gives that detects and manages print data. A print data transmission unit generates a print job and transmits it to a printer. The printer analyzes the received print job, and repeatedly applies the print setting information set to one record to each of the records to thereby execute print processing.

9 Claims, 20 Drawing Sheets

- 300
- 301 BASIC I/O PROGRAM
- 302 OS
- 303 CONTROL PROGRAM
- 304 RELEVANT DATA
- 305 WORK AREA

- 400
- 401 VOLUME INFORMATION
- 402 DIRECTORY INFORMATION
- ...
- 403 CONTROL PROGRAM
- 404 RELEVANT DATA
- ...

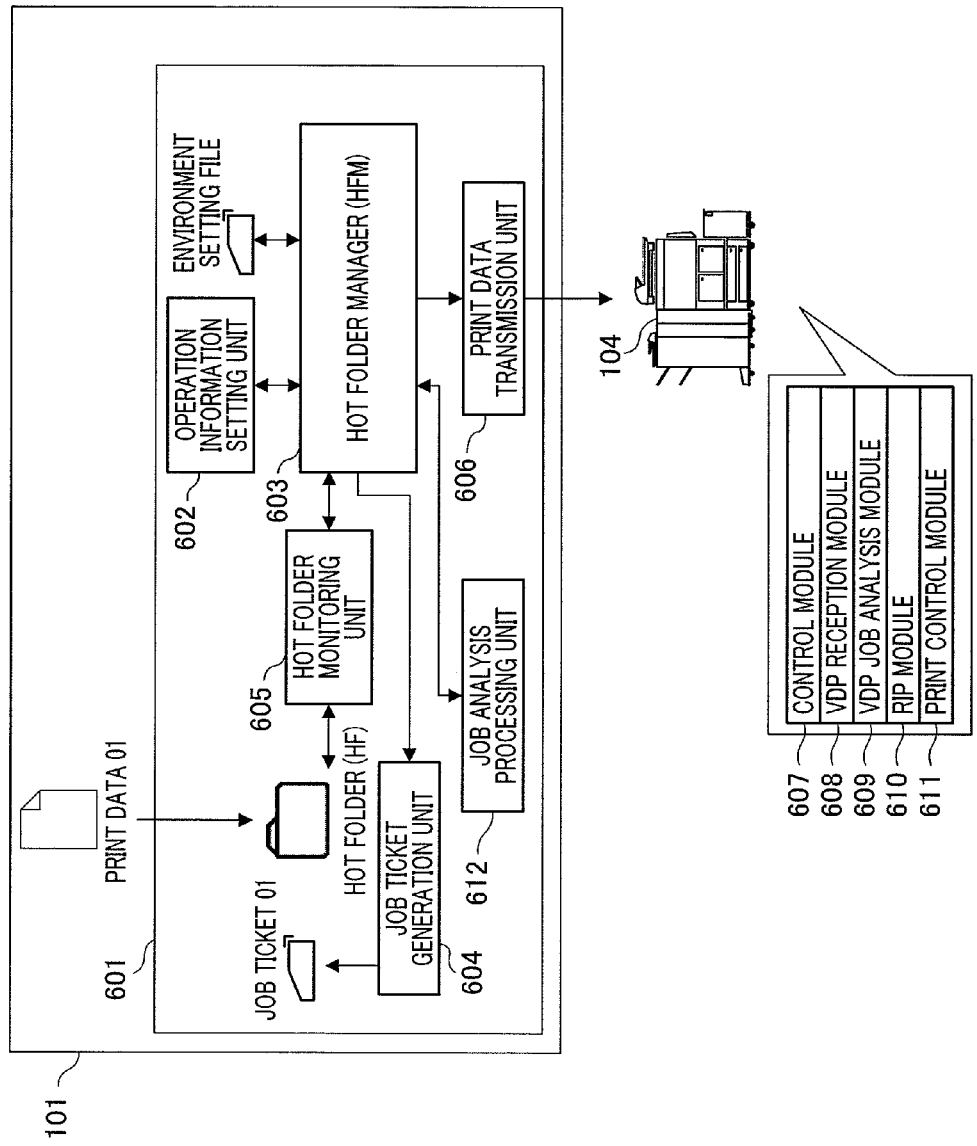

| Record table (The number of pages) | Record number |
|---|---|
| 10 | 1, 2, 3, 10, 14··· |
| 12 | 8 |
| 14 | 7 |
| 16 | 5, 6, 20, 22··· |

INFORMATION PROCESSING APPARATUS, INFORMATION PROCESSING METHOD, PROGRAM, AND INFORMATION PROCESSING SYSTEM

BACKGROUND OF THE INVENTION

1. Field of the Invention

The present invention relates to print setting processing of print data with a record as a unit of processing. In particular, the present invention relates to a variable data print processing technique.

2. Description of the Related Art

In recent years, in Variable Data Printing (hereinafter also referred to as "VDP") for printing data in accordance with the needs for each user, the registered customer data or the like for a single job is printed by using a record as a unit. The term "record" refers to a unit of processing for a series of VDP. For example, when printing is performed on a customer by customer basis, one record is constituted by print data for one customer. One VDP job may include many records ranging from tens of thousands to hundreds of thousands. In a job for VDP, the job is associated with a variable object which may vary depending on each of the records, is combined with a master object which serves as the common background of the records, and the resultant data is printed. Such a job for VDP is managed by using a job as a unit even if a plurality of records is included, and is hereinafter referred to as a "VDP job". Also, an object, which is employed for multiple times in a job, is referred to as a "reusable object". A bitmap image or intermediate data, which has been subject to image expansion, is held and reused for a subsequent usage, whereby processing time may be reduced. A master object is also an example of reusable object.

As VDP has been widely used, there has been an increasing demand for providing an exception setting for records. Hereinafter, an exception setting for a plurality of records is referred to as a "record exception setting". FIG. 21A shows an example in which print media for three records is specified by a user using a setting (tabbed paper, thick paper) that is different from the basic setting (plain paper). Basic setting information is applied to the entire record for the print data. Also, the record length indicates the number of pages constituting a record. In the present embodiment, each of the records has four pages, and thus, the record length is four. For each of the records, a tabbed paper is set to the first page, a thick paper is set to the fourth page, and a plain paper (basic setting) is set to the second and third pages.

Japanese Patent Laid-Open No. 2004-185489 discloses a method for providing an exception setting to a normal document without record information. For a document having a hierarchical structure, a print setting that does not apply to all pages is provided to the designated page(s) other than the entire pages.

In the technique disclosed in Japanese Patent Laid-Open No. 2004-185489, a specified operation needs to be performed for all of the pages for which a user wishes to provide an exception setting, and processing adapted to a VDP job is not particularly performed. For example, when a direct mail, which has been personalized for each customer, is generated as a VDP job for printout, a user needs to specify a page(s) to be subject to an exception setting using the serial page number based on the leading page of the first record. In the example shown in FIG. 21B, for the serial page numbers 1 to 12 ranging from the first record to the third record, a user needs to provide an exception setting (tabbed paper) for pages 1, 5, and 9, and provide an exception setting (thick paper) for pages 4, 8, and 12. Thus, even when the same exception setting is repeated for each record, a user needs to specify the pages for all records, for which a user wishes to provide an exception setting, using the serial page number starting from the leading page of the first record, resulting in a complicated operation.

SUMMARY OF THE INVENTION

The present invention provides an information processing apparatus that registers print setting information for one record and repeatedly applies it to each of the records to thereby improve the operability of print setting for a plurality of records.

In view of the foregoing, according to an aspect of the present invention, an information processing apparatus that performs print setting processing of print data with a record as a unit of processing and outputs a print job after the print setting processing is provided that includes a setting unit configured to provide a screen for applying a print setting information for the print data to a page in each of records, and receive the print setting information in which a leading page of each of the records is specified as a first page for a page or a page range in each of the records to perform print setting; a management unit configured to detect and manage the input print data; and a transmission unit configured to generate and output a print job including the print setting information which the setting unit sets and the print data in accordance with the instruction which the management unit gives. When the print setting information is applied to a page or a page range specified in each of the records, the transmission unit generates and transmits a print job for repeatedly applying the print setting information set to one record to each of the records.

According to the present invention, an information processing apparatus that registers print setting information for one record and repeatedly applies it to each of the records to thereby improve the operability of print setting for a plurality of records may be provided.

Further features of the present invention will become apparent from the following description of exemplary embodiments with reference to the attached drawings.

BRIEF DESCRIPTION OF THE DRAWINGS

FIG. 4 is a diagram illustrating the software configuration of a print processing unit.

DESCRIPTION OF THE EMBODIMENTS

Hereinafter, preferred embodiments of the present invention will be described with reference to the drawings.

Firstly, an information processing system of the present invention will be described. In the present embodiment, a print processing system in which an information processing apparatus is connected to an image forming apparatus via a network is shown.

Figure 1:
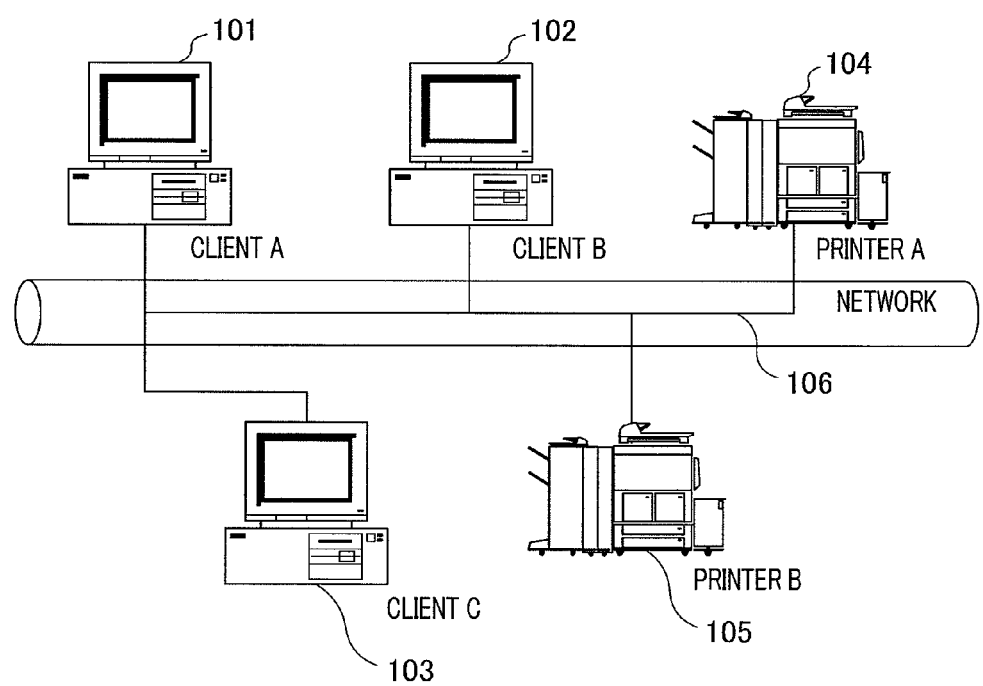
FIG. 1 is a diagram illustrating the configuration of a print processing system according to one embodiment of the present invention.

FIG. 1 is a diagram illustrating an example of the overall configuration of a print processing system. In FIG. 1, computers 101 to 103 are connected to a network 106 so as to enable communication between them. Typically, a personal computer (PC) is used for each of the computers 101 to 103. Each of the computers 101 to 103 is connected to the network 106 via a network cable complying with Ethernet (registered trademark) standards or the like. Each of the computers 101 to 103 has a function that can execute various programs such as an application program or the like and outputs a print job after print setting processing so as to transfer the print job to the network printers 104 and 105.

Each of the network printers 104 and 105 serving as image forming apparatuses is connected to the network 106 via a network interface (not shown). Each of the network printers 104 and 105 analyzes a print job including print data, which has been transmitted from the computers 101 to 103, and converts the print job into a dot image for each page for printout. Note that the network printers may have a different function.

Figure 2A:
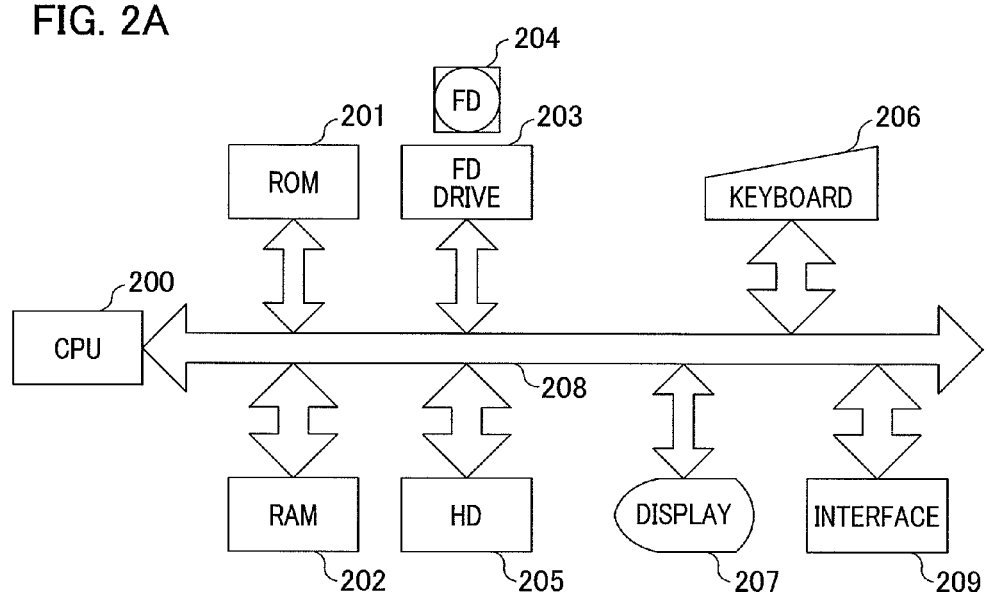
FIG. 2A is a diagram illustrating an example of the schematic configuration of the client computer shown in FIG. 1.
Figure 2B:
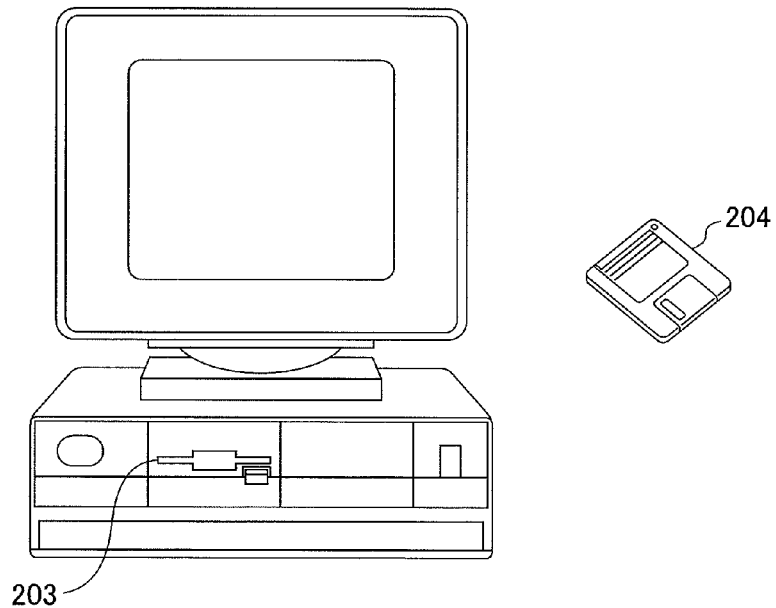
FIG. 2B is a diagram illustrating an example of the external appearance of the client computer shown in FIG. 1.

FIG. 2A is a block diagram illustrating an example of the configuration of each of the computers 101 to 103. FIG. 2B shows an example of the external appearance of a client computer, a flexible disk (hereinafter abbreviated as FD) 204 and an FD drive 203 both serving as a storage medium. The FD 204 stores a control program and relevant data to be described in the present embodiment.

A central processing unit (hereinafter abbreviated as "CPU") 200 for controlling the overall apparatus interprets and executes various programs. The CPU 200 executes an application program, a printer driver program, an OS (operating system), which are stored in a hard disk (HD) 205, a network printer control program of the present embodiment, and the like. Also, the CPU 200 controls a RAM (Random Access Memory) 202 such that it temporarily stores information, files, and the like required for the execution of the programs. The RAM 202 is used as a main memory, work area, and the like of the CPU 200. A ROM (Read Only Memory) 201 stores a program such as a basic I/O program and the like and various data such as font data, template data, and the like to be used upon document processing.

The FD drive 203 reads a program or the like stored in the FD 204 and loads it into a computer. A storage medium storing a computer-readable program is not limited to an FD, but any storage medium such as a CD-ROM, a CD-R, a CD-RW, a PC card, a DVD, an IC memory card, an MO, a memory stick, and the like may be employed. A hard disk (HD) 205 functions as a large-capacity memory and stores an application program, a printer driver program, an OS, a control program, a relevant program, and the like. A keyboard 206 is an operation unit configured to input and instruct a device control command or the like. Such a device control command or the like is provided to a client computer by a user or provided to a print server by an operator or an administrator. A display 207 displays the command input by the keyboard 206, the state of various settings, the state of printer, and the like. A system bus 208 brings the components in a computer into connection so as to transmit/receive the necessary data. An interface 209 plays a role in connecting a computer to an external apparatus to perform data exchange therebetween.

Note that the configuration of the information processing apparatus is not limited to that shown in FIGS. 2A and 2B. For example, the storage location of data and programs may also be changed to ROM, RAM, HD, or the like depending on their characteristics.

Figure 3A:
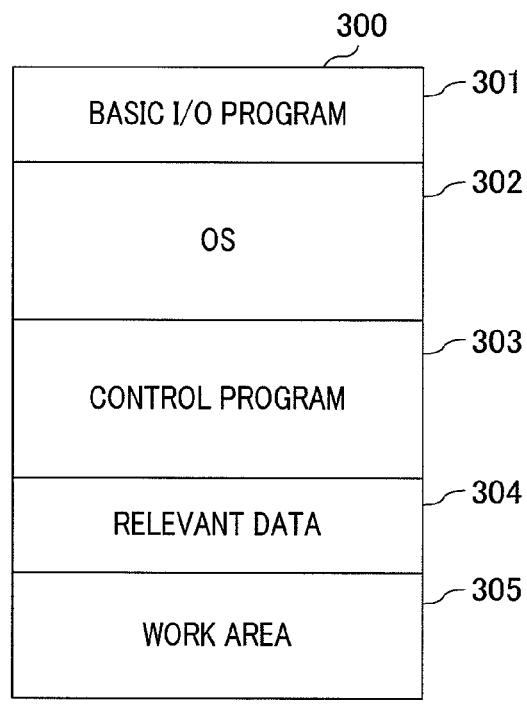
FIG. 3A is a memory map of the RAM shown in FIG. 2.

FIG. 3A is a diagram illustrating an example of the memory map of the RAM 202 shown in FIG. 2A. FIG. 3A shows the memory map of the RAM 202 in the state where the control program according to the present embodiment is read out from the FD 204, and loaded into the RAM 202 so as to be executable.

The present embodiment provides an example in which a control program and relevant data are loaded directly from the FD 204 to the RAM 202 and are executed by the CPU 200. A basic I/O program 301 is read from the HD 205 to the RAM 202 when the power source of a computer is turned ON. A program having an IPL (Initial Program Loading) function, or the like for starting the operation of the OS is stored in the storage area of the program. An OS main unit 302, a control program 303, and relevant data 304 are respectively stored in the secured areas of the RAM 202. An area for executing the control program 303 by the CPU 200 is ensured in a work area 305.

While the present embodiment shows that the CPU 200 loads the control program 303 and the relevant data 304 from the FD 204 directly to the RAM 202, such a configuration may not always be necessary. The CPU 200 may also load a control program or the like, which has already been installed from the FD 204 to the HD 205, into the RAM 202. Further-more, it is also possible that the CPU 200 stores the control program 303 in the ROM 201 and this is configured to become a part of the memory map so that the CPU 200 directly executes the control program 303. Alternatively, software for realizing a functionality equivalent to the aforementioned devices may also be provided as a replacement for hardware devices.

Figure 3B:
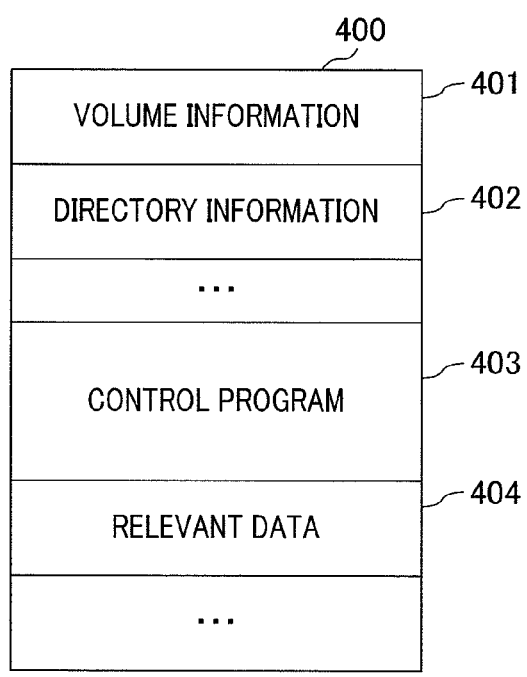
FIG. 3B is a memory map representing data in a flexible disk (FD).

FIG. 3B is an exemplary memory map representing data in the FD 204 shown in FIGS. 2A and 2B. Volume information 401, directory information 402, a control program 403, and their relevant data 404 are arranged on a memory map. The control program 403 is programmed based on the flowchart described in the present embodiment. In the present embodiment, both a client machine and a server have the same configuration.

FIG. 4 shows a function module illustrating the configuration of a print processing unit 601 in the computer 101. The print processing unit 601 processes VDP data that has been provided to a folder(s) (hereinafter referred to as a "hot folder" and abbreviated as "HF") of the computer 101 serving as a client machine. In FIG. 4, VDP data is indicated by "print data 01". An operation information setting unit 602 is a setting unit that presets operation information regarding the HF monitoring interval, print setting for the provided VDP data, and the like. In order to display the list of information subject to analysis processing or to prompt setting when insufficient setting is found upon printing, the operation information setting unit 602 displays a user interface (referred to as "UI") screen on the display 207 so as to receive a user's operation instruction. A hot folder manager (hereinafter abbreviated as "HFM") 603 activates an HF monitoring unit 605 for each HF, and detects print data that has been provided to each HF for a predetermined period. An HFM 603 has a function for the management of the HF, a new registration and deletion of the HF, and the like. The HFM 603 refers to an environment setting file according to necessity.

A job ticket generation unit 604 generates a job ticket (including information indicating the specified processing content). "A job ticket 01" shown in FIG. 4 has print setting information set by the operation information setting unit 602. The HF monitoring unit 605 monitors the provision of print data to an HF. A print data transmission unit 606 packages the print data 01 provided to an HF and the job ticket 01 and then transmits the packaged data to the network printer 104. A job analysis processing unit 612 performs data analysis of the received VDP data.

The network printer 104 includes a control module 607, a VDP reception module 608, a VDP job analysis module 609, an RIP module 610, and a print control module 611 (the components will be described in detail below).

First Embodiment

Figure 5:
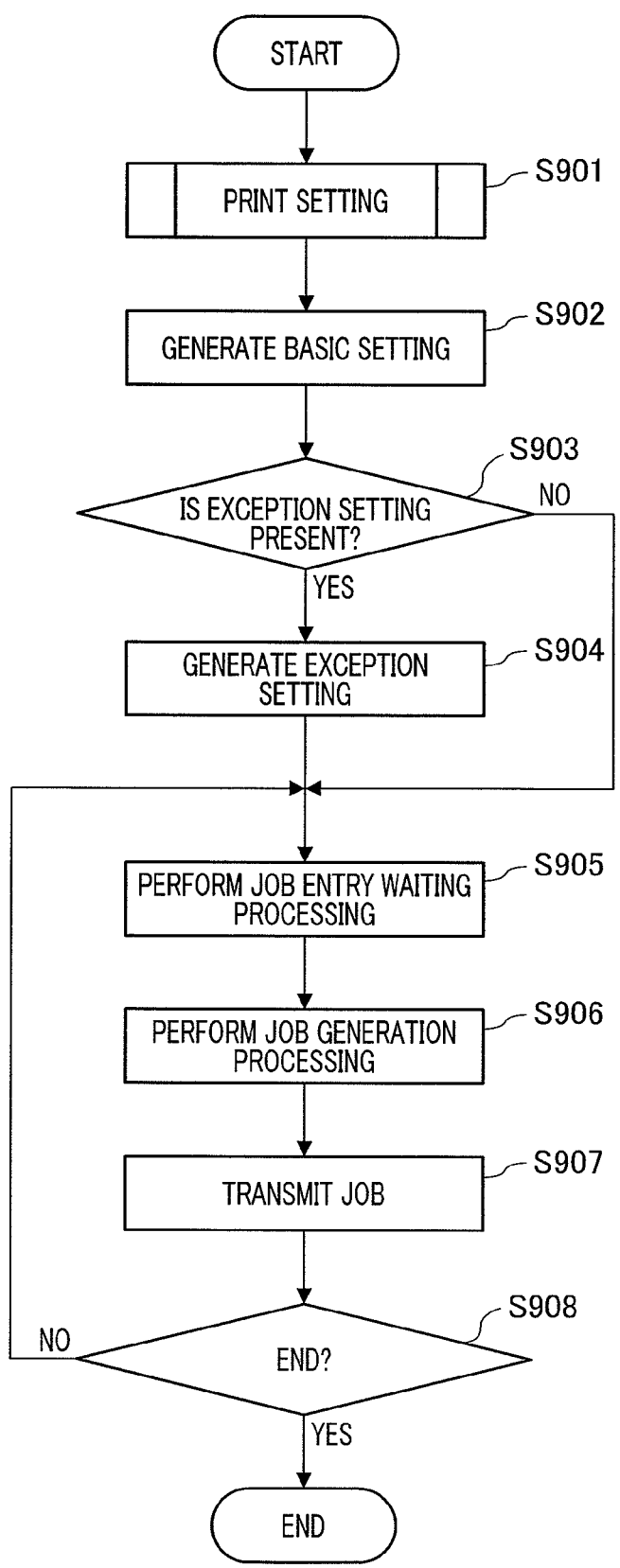
FIG. 5 is a basic flowchart illustrating a first embodiment of the present invention in conjunction with FIGS. 6 to 10.
Figure 6:
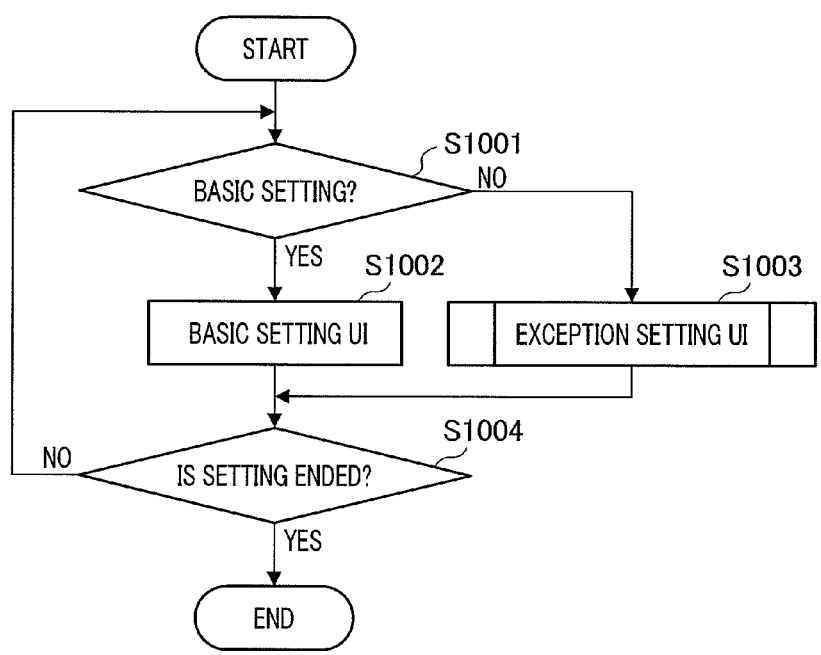
FIG. 6 is a flowchart illustrating an example of determination processing on a print setting screen.

Hereinafter, a description will be given of a first embodiment of the present invention. FIG. 5 is a basic flowchart illustrating an exemplary flow which defines a series of processes from the activation of the HFM 603 to the transmission of VDP data to the network printer 104. FIG. 6 is a flowchart illustrating the details of print setting processing in step S901.

Figure 7:
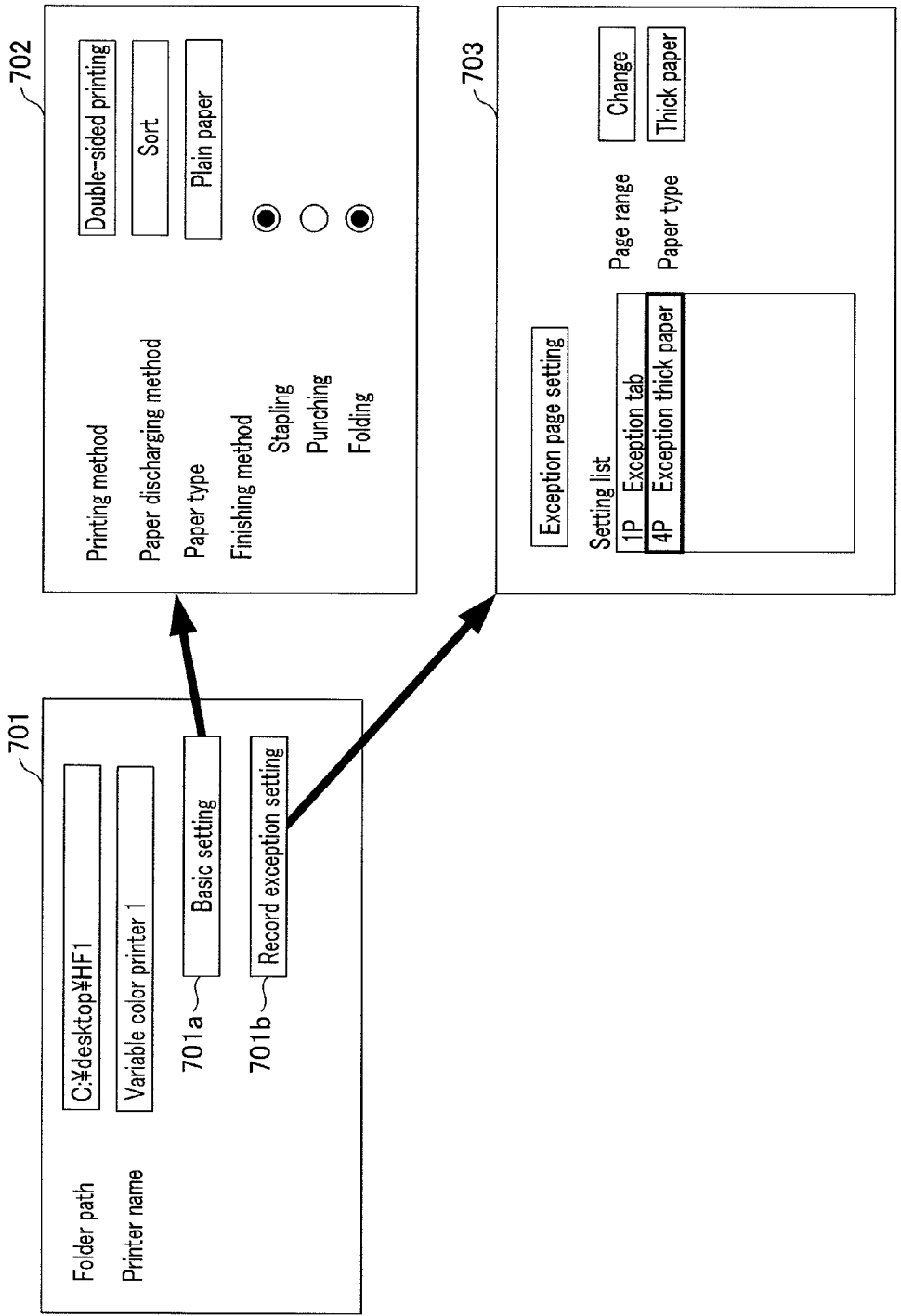
FIG. 7 is a diagram illustrating examples of display screens for the basic setting and the record exception setting.

In step S901 shown in FIG. 5, a print setting is made for an HF. The content of the setting processing is as shown in FIG. 6, and the operation information setting unit 602 is responsible for making print setting. FIG. 7 shows an example of a setting UI screen for the basic setting and the exception setting. It is determined in step S1001 shown in FIG. 6 that which one of the settings (either the basic setting or the record exception setting) has been selected by a user. As shown in a screen 701 shown at the left side in FIG. 7, a folder path and a printer name are displayed on the screen of the display 207 and a selection button 701a for the basic setting and a selection button 701b for the record exception setting are presented. The term "basic setting" refers to a setting that is applicable to the overall records and is involved in a comprehensive setting. On the other hand, the term "record exception setting" refers to a setting that is different from the basic setting and is applicable only to a designated page(s) in a record, and is involved in the individual setting for each page. When the basic setting is determined as the determination result in step S1001, the process advances to step S1002, whereas when the record exception setting is determined as the determination result, the process advances to step S1003.

In step S1002, a UI screen for basic setting is displayed and setting processing is performed. A UI screen for a printing method, a paper discharging method, and a finishing method is displayed on a screen 702 shown at the top right in FIG. 7. When a user specifies the desired basic setting information on the screen, the operation information setting unit 602 stores basic setting information in a memory. In step S1003, a UI screen for the record exception setting is displayed to perform setting processing. A setting list for exception page(s), a page range, and a paper type are displayed on a screen 703 shown at the lower right in FIG. 7. When a user makes a desired setting on the screen, the operation information setting unit 602 stores exception setting information in a memory. The designated page numbers are page numbers in which the first page of a record as a unit of processing is the leading page.

Figure 8:
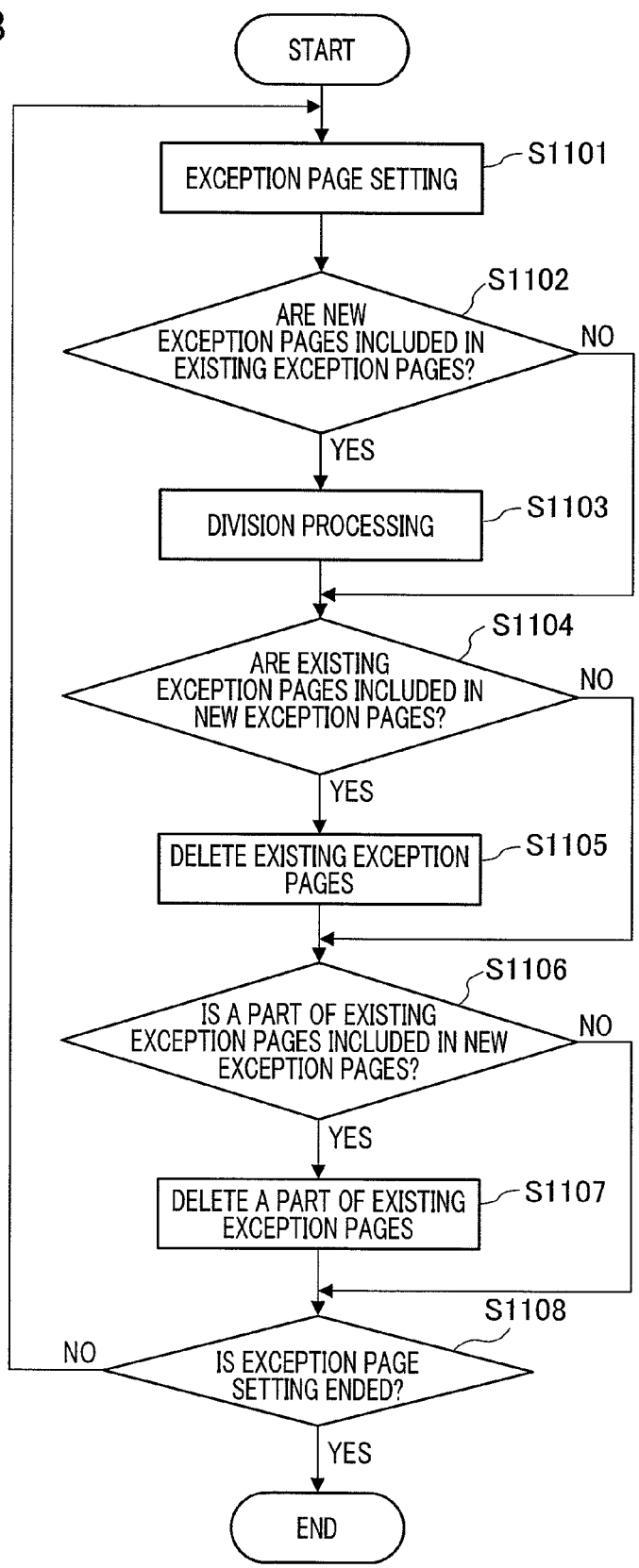
FIG. 8 is a flowchart illustrating an example of control processing for an exception setting.

FIG. 8 is a flowchart illustrating the details of exception setting processing.

In step S1101, exception pages are inserted. When pages for the exception setting are inserted on the UI screen, the inserted pages are subject to processing, which is classified into three types: "division, total deletion, and partial deletion" (the content of each process will be described below), in accordance with the inserted exception page numbers. Next, in step S1102, it is determined whether or not new exception pages are included in existing exception pages. Here, when it is determined that the new exception pages are included in the existing exception pages, the process advances to step S1103, whereas when it is determined that the new exception pages are not included in the existing exception pages, the process advances to step S1104.

In step S1103, the range of the existing exception pages is divided into two. For example, assume that the existing exception pages are pages 10 to 20 and the new exception pages are pages 13 to 17. In this case, the existing exception pages are divided into two groups: pages 10 to 12 and pages 18 to 20 by division processing.

In step S1104, it is determined whether or not the existing exception pages are included in the new exception pages. When it is determined that the existing exception pages are included in the new exception pages, the process advances to step S1105, whereas when it is determined that the existing exception pages are not included in the new exception pages, the process advances to step S1106. In step S1105, the existing exception pages are deleted. For example, when the existing exception pages are pages 14 to 17 and the new exception pages are pages 10 to 20, the existing exception pages, i.e., pages 14 to 17, are deleted.

In step S1106, it is determined whether or not a part of the existing exception pages is included in the new exception pages. When it is determined that a part of the existing exception pages is included in the new exception pages, the process advances to step S1107, whereas when it is determined that a part of the existing exception pages is not included in the new exception pages, the process advances to step S1108. In step S1107, a part of the existing exception pages is deleted. For example, when the existing exception pages are pages 10 to 20 and the new exception pages are pages 5 to 15, pages 10 to 15 are deleted among the existing exception pages.

Through the aforementioned steps, the process advances to step S1108 to determine the end of exception page setting. When a user pushes an end button or the like on the UI screen to instruct a device to end exception page setting, exception page setting is ended, and the process advances to step S1004 in FIG. 6. When a user does not instruct a device to end exception page setting, the process returns to step S1101.

In step S1004, it is determined whether or not exception page setting has been ended. When a user pushes an end button or the like on the UI screen to instruct a device to end exception page setting, the process advances to step S902 in FIG. 5. When exception page setting is not ended, the process returns to step S1001 in FIG. 6.

The processes shown in steps S902 to S904 in FIG. 5 are performed by the job ticket generation unit 604. In step S902, the job ticket generation unit 604 performs basic setting generation processing. In accordance with the basic setting in step S901, basic setting information about setting relating to the entire record such as finishing setting or the like is set to a job ticket. In the present embodiment, basic setting information and exception setting information are set to different jobs in order to switch only the exception setting. However, it is also effective that such information is set to the same job ticket. In step S903, the presence/absence of the exception setting is determined. Here, when it is determined that the exception setting is present, the process advances to step S904, whereas when it is determined that no exception setting is present, the process advances to step S905. The details of processing of step S904 are shown in the flowchart in FIG. 9.

In step S1201, exception setting information is read. Here, reading information is exception setting information for one record. Exceptional setting will be specifically described taking an example of the UI screen shown in FIG. 7. When a "record exception setting" button 701b shown at the left side of the screen 701 is operated, the screen 703 at the lower right is displayed. As shown in the setting list, since a "1P exception tab" setting and a "4P exception thick paper" setting are made for one record, the number of exception settings becomes two. In the present embodiment, a "tabbed paper" setting is made to the first page of each of the records, and a "thick paper" setting is made to the fourth page thereof.

Figure 9:
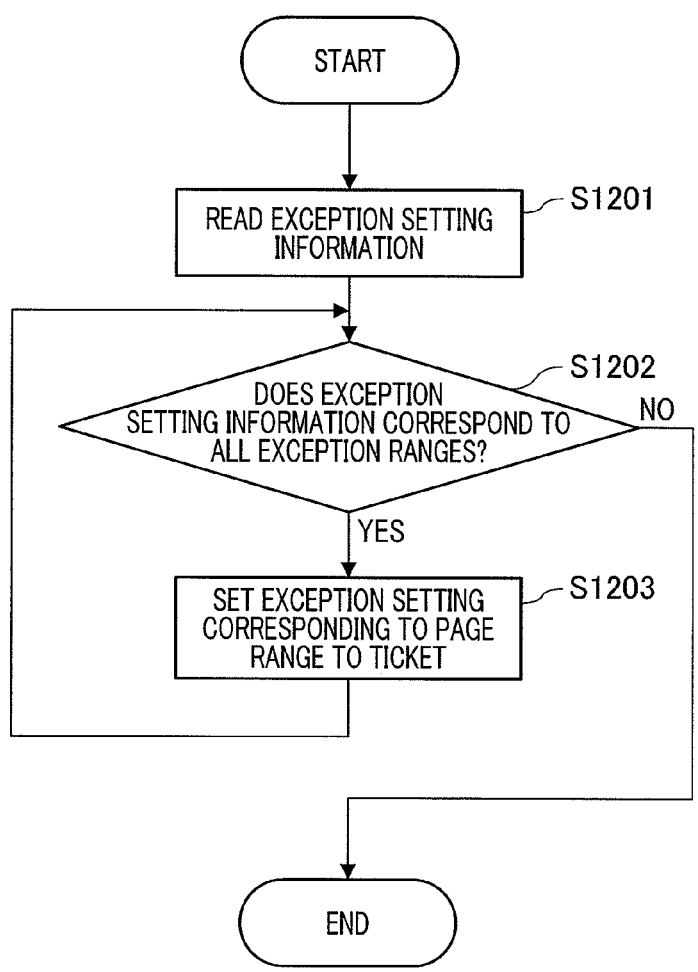
FIG. 9 is a flowchart illustrating an example of page range application processing for an exception setting.

In step S1202 shown in FIG. 9, it is determined whether or not all the above-mentioned exception setting information is set to a job ticket. When the above-mentioned exception setting information has already been set to a job ticket, the process advances to step S905 in FIG. 5. When all the exception settings are not set to a job ticket, the process advances to step S1203. In step S1203, the above-mentioned exception setting is set to a job ticket. After the exception setting corresponding to a page range is set to a job ticket, the process returns to step S1202.

In step S1203, exception setting information, which has been specified by a user on the UI screen in FIG. 7, is read, job ticket setting processing is executed by comparing the exception setting with the page range. An exemplary job ticket setting is shown in the following:

<page range (RunIndex)="1"> <media (Media)="tab">
<page range (RunIndex)="4"> <media (Media)="thick paper">

In step S905 shown in FIG. 5, job entry waiting processing is performed. In step S905, the HF monitoring unit 605 shown in FIG. 4 monitors an HF at a regular interval and checks whether or not print data is provided to the HF. As a print data provision confirmation method, the HF monitoring unit 605 reads the number and the names of print data (files) in a folder during HF monitoring at a regular interval and examines the difference between current information and previous information to detect the newly provided print data. Alternatively, when the folder state (an increase or decrease in the number of files in a folder or the like) has been changed, the HF monitoring unit 605 monitors an HF by subjecting to event registration so as to receive event notification from a system. An HF monitoring unit is well known, and no further description will be made thereon.

When the HF monitoring unit 605 detects that the "print data 01" has been provided to an HF, the HF monitoring unit 605 reports the HFM 603, and the process advances to step S906 in FIG. 5. In step S906, the print data transmission unit 606 packages the provided print data and print setting information set to the HF to thereby generate a print job. A well known technique such as MIME (Multipurpose Internet Mail Extensions) or the like is known as a packaging method, and no further description will be made thereon. When job generation processing is ended, the process advances to step S907. In step S907, job transmission processing is performed. The print data transmission unit 606 transmits the generated VDP job to the network printer 104.

In step S908, it is determined by the HFM 603 whether or not a job transmission has been ended. When a user pushes an end button or the like on the UI screen to instruct a device to end a job transmission, the HFM 603 ends the execution of program. When an end instruction is not made, the process returns to step S905.

Next, a description will be given of the outline of processing performed when the network printer 104 shown in FIG. 4 receives a VDP job from the print data transmission unit 606. A VDP job reception module 608 receives a VDP job from the print data transmission unit 606 via a network I/F (interface), and stores the VDP job in a storage device (not shown) (e.g., HDD). Upon completion of the processing, the VDP job reception module 608 reports completion of the processing to a control module 607. When the control module 607 receives the report, the control module 607 instructs a VDP job analysis module 609 to perform VDP job analysis processing.

The VDP job analysis module 609 analyzes the VDP job received from the VDP job reception module 608 in accordance with an instruction given by the control module 607. After analysis, the VDP job analysis module 609 reports completion of the processing to the control module 607. When the control module 607 receives the report, the control module 607 instructs an RIP (Raster Image Processor) module 610 to perform RIP processing for the analyzed data. The RIP module 610 receives the analyzed data to perform RIP processing in accordance with an instruction given by the control module 607. Upon completion of the processing, the RIP module 610 reports completion of the processing to the control module 607. When the control module 607 receives the report, the control module 607 instructs a print control module 611 to perform print processing for data subjected to RIP processing.

Figure 10:
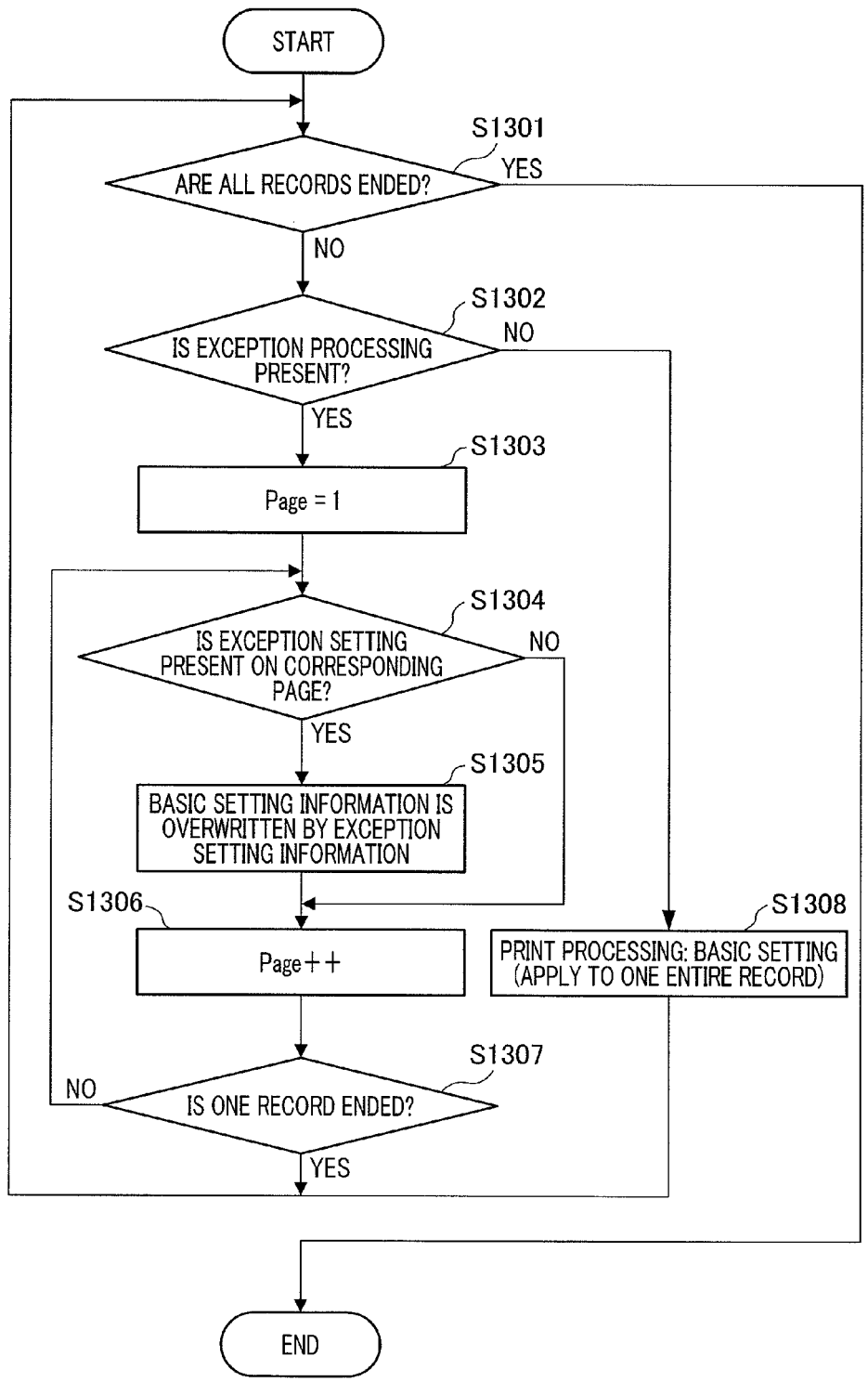
FIG. 10 is a flowchart illustrating an example of VDP data processing performed by a printer.

FIG. 10 is a flowchart illustrating the details of processing performed by the VDP job analysis module 609.

In step S1301, it is determined whether or not all processing for record data in the read VDP job has been completed. When an unprocessed record is present, the process advances to step S1302. When processing for the entire record has been completed, a processing completion is reported to the control module 607. In step S1302, it is determined whether or not exception setting processing is present during performing a print job. When exception setting processing is present, the process advances to step S1303. When there is no exception setting, the process advances to step S1308. Basic setting information is stored as setting information about the entire record in a memory, and then, the process returns to step S1301.

In step S1303, the value of a variable Page indicating the page number is initialized to one. Next, in step S1304, it is determined whether or not the exception setting is made to the page corresponding to the value of the variable Page. When the exception setting is present, the process advances to step S1305, and basic setting information about the page is overwritten by exception setting information. More specifically, when media setting information for the basic setting is plain paper and the media setting information for the exception setting on a fourth page is a thick paper, the media setting information about the fourth page is stored as a thick paper. When there is no exception setting on the page in step S1304, the process advances to step S1306. In step S1306, the page number is increased to increment the value of the variable Page. Next, in step S1307, it is determined whether or not exception setting confirmation processing has been completed for all pages of the records of interest. When exception setting confirmation processing has been completed for all pages of the records of interest, the process returns to step S1301. When there are some pages for which the exception setting has not been confirmed, the process returns to step S1304.

Figure 21A:
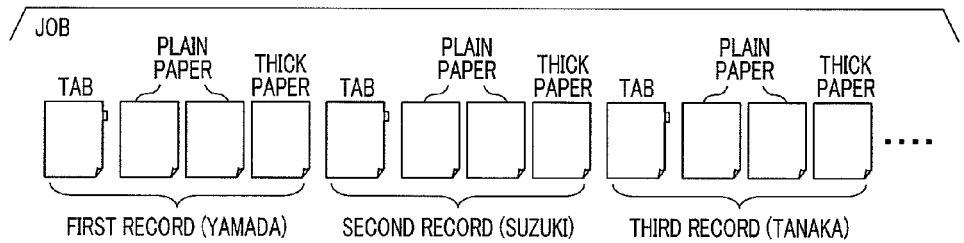
FIG. 21A is a diagram illustrating an example of a record exception setting.
Figure 21B:
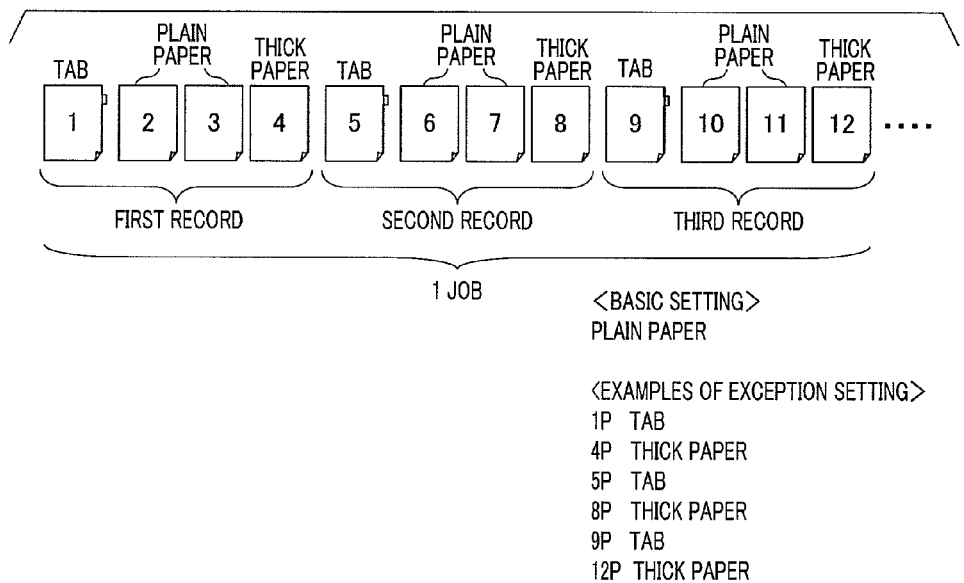
FIG. 21B is a diagram illustrating an example of the conventional exception setting.
Figure 21C:
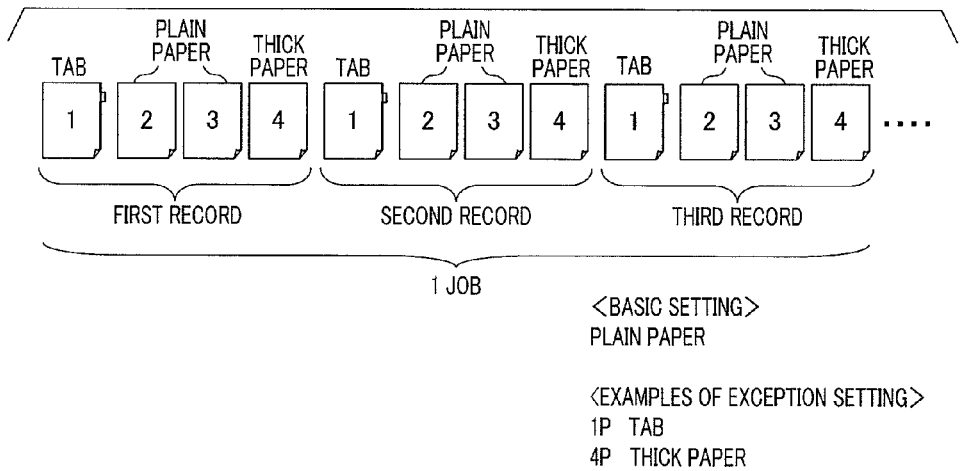
FIG. 21C is a diagram illustrating an example of an exception setting according to one embodiment of the present invention.

FIG. 21C shows the fact that the exception setting for one record is repeatedly applied from the start of each of the records as a result of applying the processing. A user specifies the exception setting (tabbed paper) to the first page (leading page) of the first record, and specifies the exception setting (thick paper) to the fourth page thereof. Since the same exception setting is repeatedly applied to the second record and subsequent records, a user does not need to specify the serial page number for all records based on the leading page of the first record.

By means of processing described above, printing to which the exception setting for each of the records is applied may be performed. In other words, the exception setting for one record may be made for VDP data and may be repeatedly applied to each of the records to thereby improve the operability of print setting by a user.

Second Embodiment

Next, a description will be given of a second embodiment of the present invention. In the first embodiment, a method for repeatedly applying one exception setting to a plurality of records has been described. In the second embodiment, a description will be given of exception setting processing in the case of a variable record length. VDP data may have different record lengths, and thus, may have data having a plurality of record lengths in one job. In the second embodiment, the exception setting may be made for each record length even when data having different record lengths is mixed in one job. A description of print setting processing as in the first embodiment is omitted, and a feature of the second embodiment will be described below.

Figure 11:
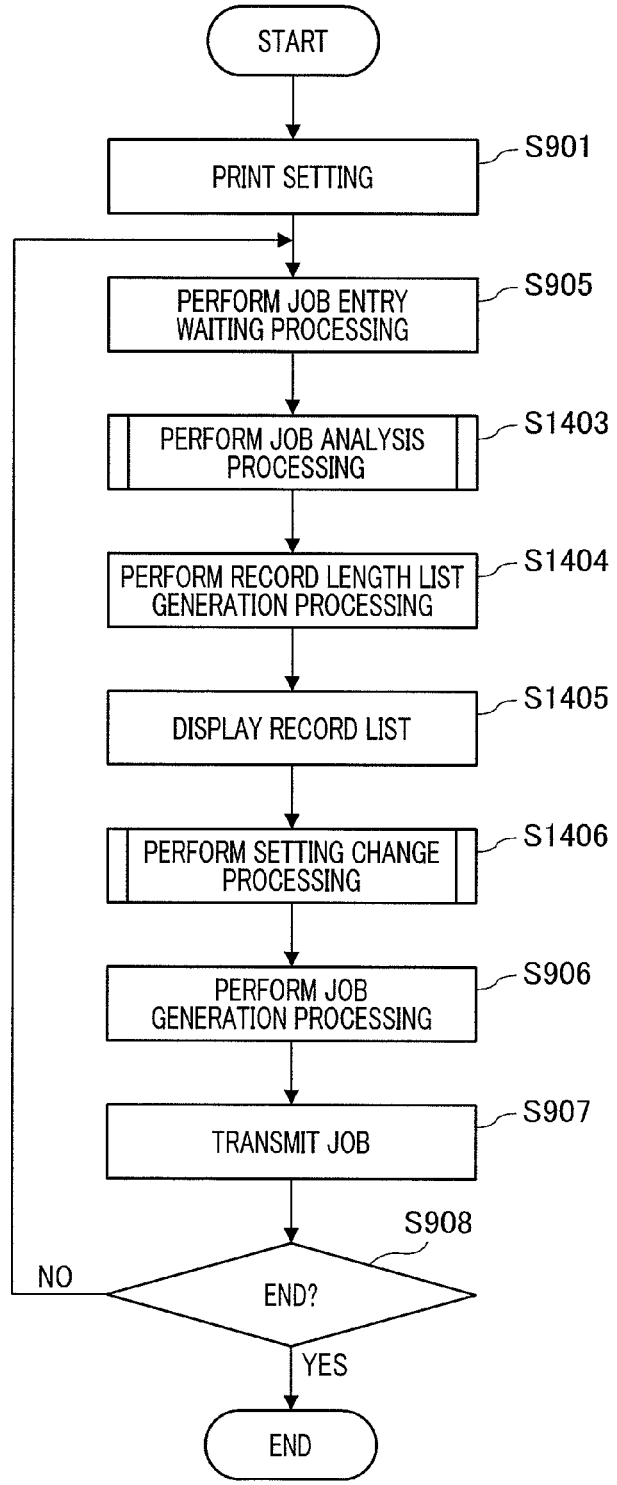
FIG. 11 is a basic flowchart illustrating a second embodiment of the present invention in conjunction with FIGS. 12 to 17.
Figure 12:
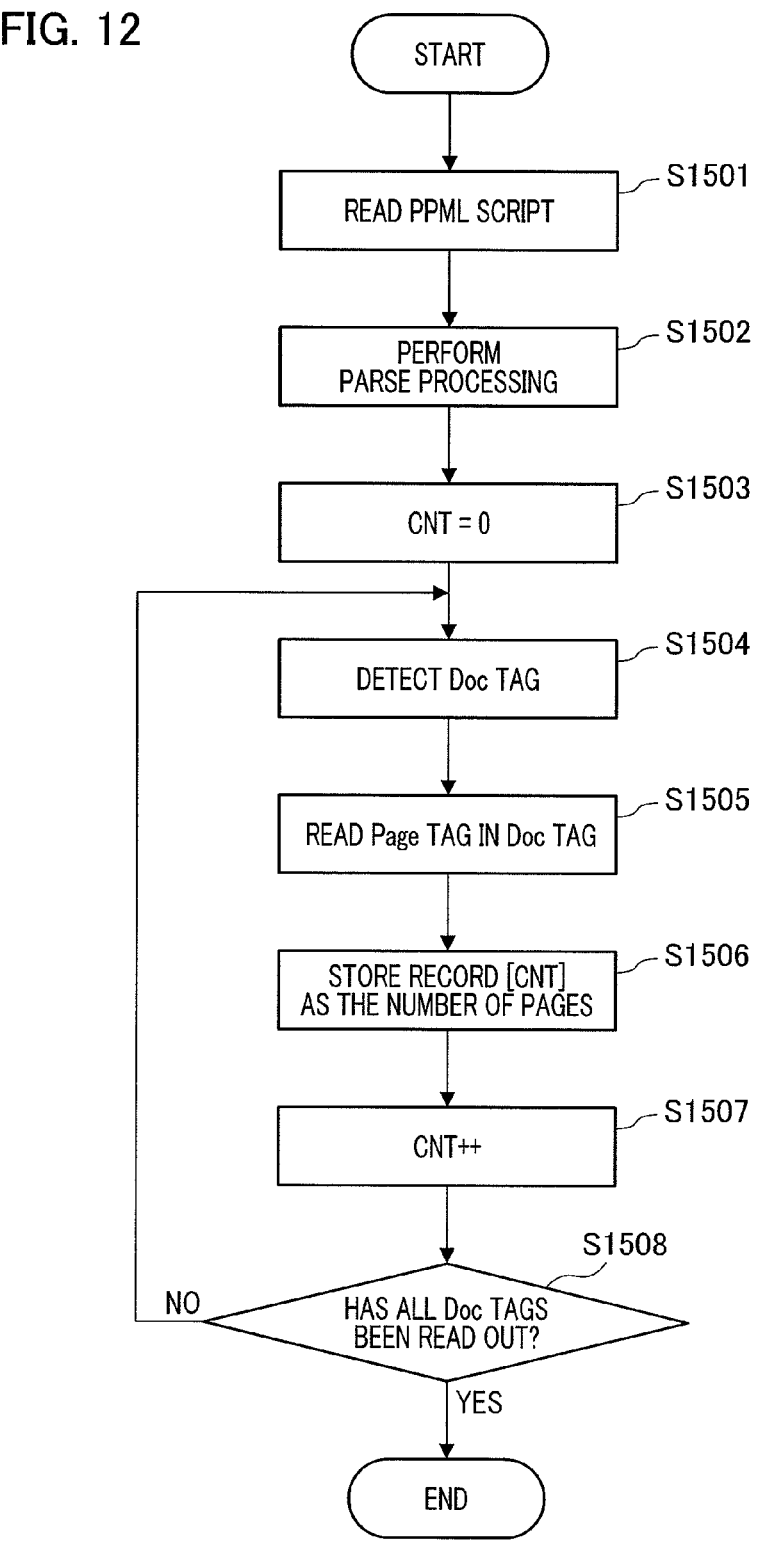
FIG. 12 is a flowchart illustrating an example of job analysis processing.

FIG. 11 is a basic flowchart illustrating an example of processing according to the second embodiment. The differences between FIG. 11 and FIG. 5 are steps S1403 to S1406 between steps S905 and S906, and a description will be given of these processes hereinbelow. FIG. 12 is a flowchart illustrating the details of step S1403.

Figures 13, 14:
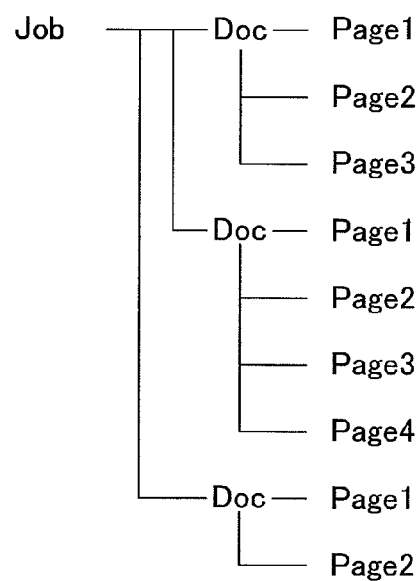
FIG. 13 is a diagram illustrating an example of a document structure.
FIG. 14 is an exemplary table illustrating the correspondence relationship between a record length (the number of pages) and a record number.

In step S1403, job analysis processing is performed by the job analysis processing unit 612 shown in FIG. 4, and the details of step S1403 will be shown in the flowchart in FIG. 12. In step S1501 shown in FIG. 12, a script which has defined a data structure in a VDP job is read out. In the present embodiment, a description will be given of PPML (Personalized Printing Markup Language) as a representative example of VDP data. Note that VDP data is constituted by a plurality of data, and is generally compressed in a ZIP format or the like for reasons of an increase in size or the like. In step S1501, a script is extracted from VDP data that has been provided to an HF. In step S1502, the script read in step S1501 is subject to analysis processing (parse processing). As illustrated in FIG. 13, a script is constituted by a JOB tag, a DOC tag for defining each of the records, and a Page tag constituting page information in DOC. Parse processing described herein is pre-parse processing for ascertaining the record length of each of the records, which analyzes and structures the read script. This allows administrators to know how many pages constitute each of the records, that is, the record length of each of the records.

In step S1503, the value of a count variable CNT is initialized to zero. In step S1504, a DOC tag(s) is detected from the script that has been read out and analyzed in step S1501. In step S1505, a Page tag(s) in the DOC tag(s) is read out. In step S1506, the number of Page tags read in step S1505 is stored as the record length of the CNT number. In other words, the number of pages is stored as the record length in an arrangement indexed by the CNT value. In step S1507, the value of the count variable CNT is incremented by one. In step S1508, it is determined whether or not all DOC tags in the read script have been read out. When there is any unread DOC tag, the process returns to step S1504. When all DOC tags in the script have been read out, the process advances to step S1404 shown in FIG. 11.

Figure 17:
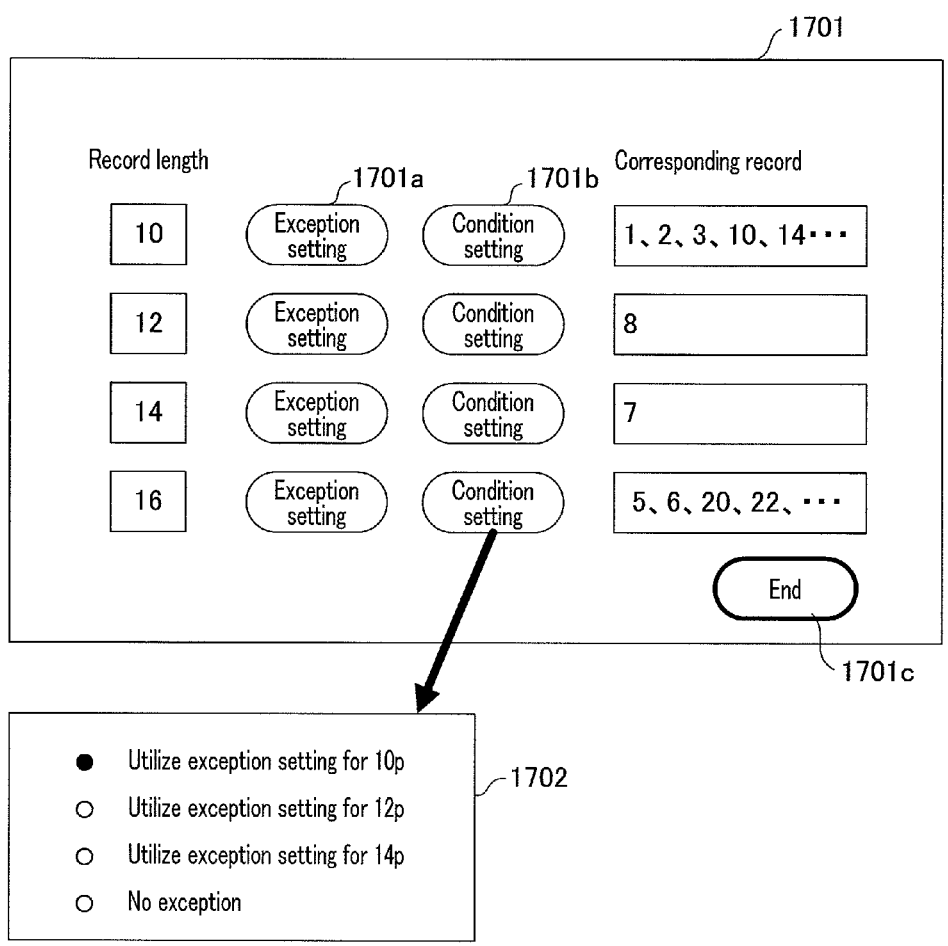
FIG. 17 is a diagram illustrating an example of a display screen for a setting candidate list.

In step S1404, a record list is generated. In the step, the records having the same length are summarized as a list of records based on the record length of each of the records that have been read out in step S1403. A typical search method is applicable to processing for detecting record numbers having the same length from the stored record length data, and the details thereof will not be described. FIG. 14 shows a table illustrating a record length (the number of pages) and a record number corresponding thereto as an exemplary search result. In step S1405, a record list is displayed in accordance with the instruction given by the operation information setting unit 602. In step S1406, setting change processing is performed. FIG. 17 shows an exemplary UI screen for use in setting change. The UI screen includes a record length and a display area for the record in question. A screen 1701 shown in FIG. 17 is provided with an exception setting button 1701a for each record length, whereby an individual exception setting can be made. A condition setting button 1701b is provided for the exception setting for each record length. When a user operates the condition setting button 1701b, candidates for the exception setting, which can be registered as the exception setting, are selected and displayed as a list as shown in a bottom-left screen 1702. In the present embodiment, the fact that the exception setting for tenth, twelfth, and fourteenth pages can be utilized is presented to a user. Since there are candidates for the exception setting which can be utilized even when the records have different record lengths, options can be presented to a user for selection and setting, resulting in increased efficiency in setting operations.

Figure 15:
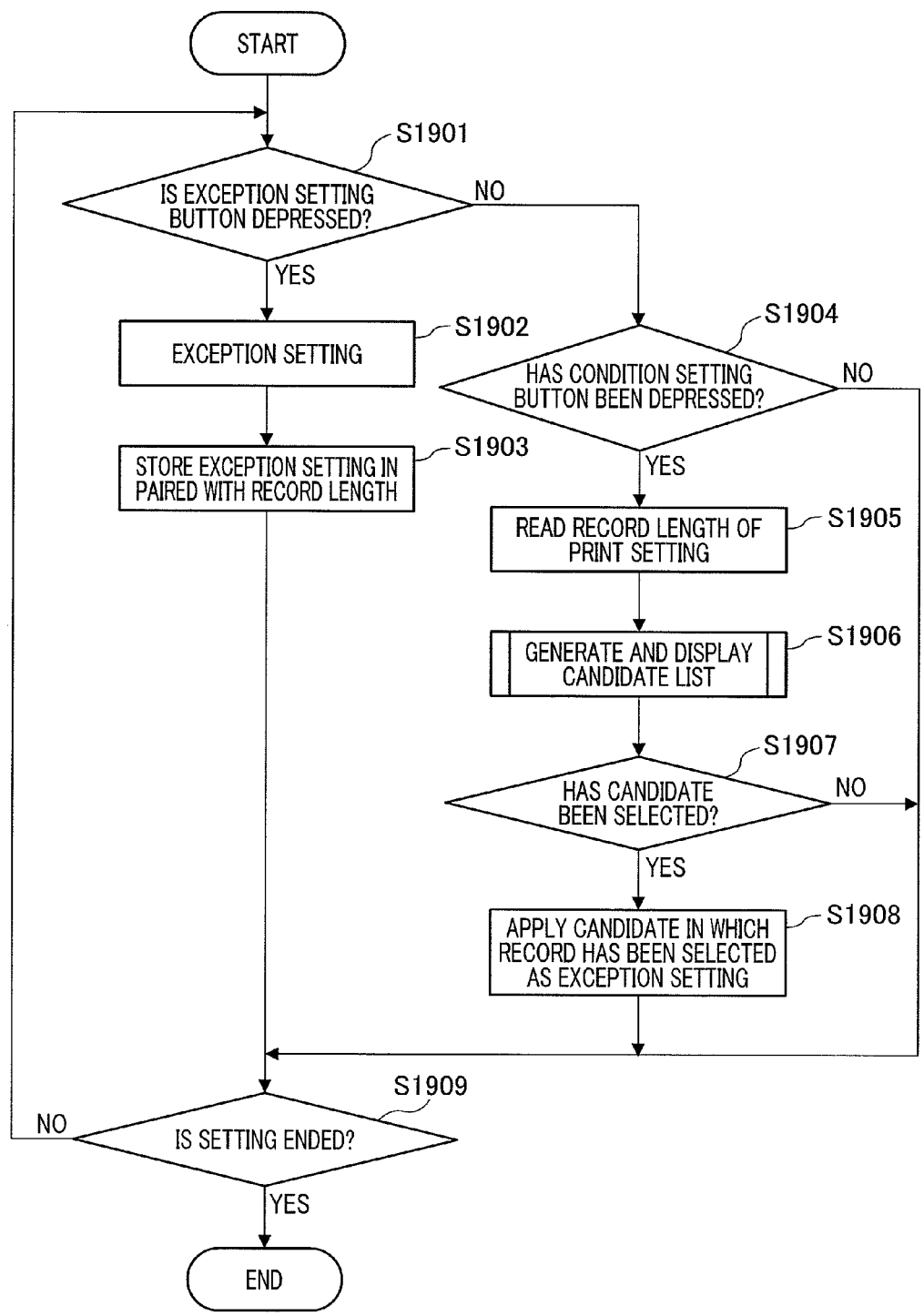
FIG. 15 is a flowchart illustrating an example of setting change processing.

FIG. 15 is a flowchart illustrating setting change processing in step S1406. In step S1901, it is determined whether or not the exception setting button 1701a in FIG. 17 corresponding to a record length has been depressed. When the exception setting button 1701*a* has been depressed, the process advances to step S1902, whereas when the exception setting button 1701*a* has not been depressed, the process advances to step S1904.

Exceptional setting processing in step S1902 is processing for setting the exception setting by presenting the UI screen to a user. The processing is the same as that in step S1003 shown in FIG. 6, and explanation thereof will be omitted. In step S1903, exception setting information, in which the exception setting made in step S1902 is associated with a record length, is stored in a memory.

In step S1904, it is determined whether or not the condition setting button 1701*b* shown in FIG. 17 has been depressed. When the condition setting button 1701*b* has been depressed, the process advances to step S1905, whereas when the condition setting button 1701*b* has not been depressed, the process advances to step S1909. In step S1905, the record length of the print setting is read. In step S1906, a candidate list when the condition setting button 1701*b* has been depressed is displayed (see FIG. 17).

Figure 16:
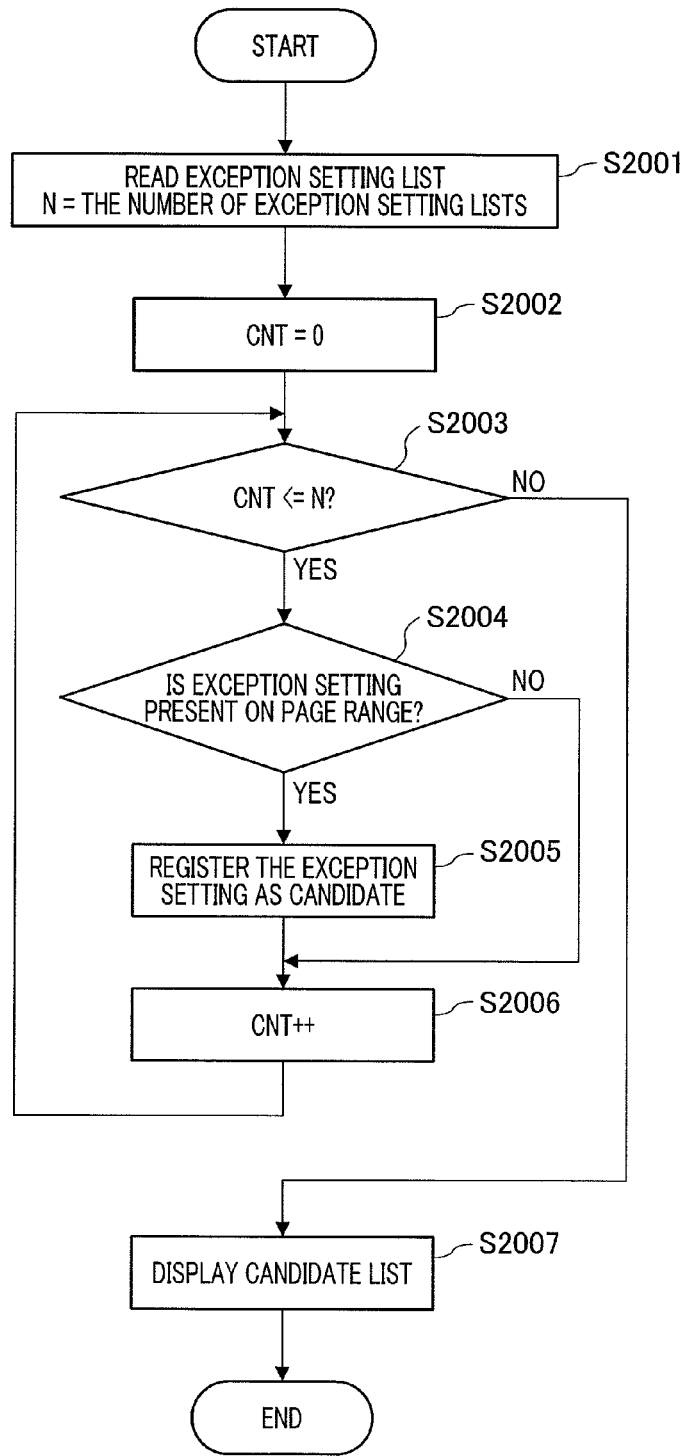
FIG. 16 is a flowchart illustrating an example of display processing for a setting candidate list.

FIG. 16 is a flowchart illustrating processing for generating and displaying a candidate list.

In step S2001, an exception setting list is read, and the number of exception settings, which have been registered as print settings, is set to a variable N. In step S2002, the value of the count variable CNT is initialized to zero. In step S2003, it is determined whether or not processing in steps S2004 to S2006, to be described below, has been performed by the number of the registered exception settings. When the CNT value is equal to or lower than N, the process advances to step S2004. When the CNT value exceeds N, the process advances to step S2007. Then, a candidate list is displayed, and the process advances to step S1907 shown in FIG. 15.

In step S2004, it is determined whether or not the exception setting is present on a page range. For example, it is meaningless to utilize an invalid setting in a case where the exception setting is made for the sixteenth page while the record length is only ten pages. Accordingly, an exception setting point is checked so as not to display a candidate list for such settings. In the present embodiment, a description will be given under the assumption that the exception setting is made outside the record range. Additionally, a logically-contradictory setting such as a double-sided setting for the set media (OHP sheet) may also be applicable as a determination condition. When it is determined in step S2004 that a valid exception setting is made within the page range, the process advances to step S2005. When it is determined in step S2004 that there is no such exception setting, the process advances to step S2006. In step S2005, the exception setting is registered as a candidate. When the registration of the exception setting candidates has been ended, the process advances to step S2006. Then, the CNT value is incremented by one, and the process returns to step S2003.

In step S2007, a candidate list is displayed, and the process advances to step S1907 shown in FIG. 15. In step S1907, a user selects a candidate from the candidates displayed in step S2007. When a user has selected a candidate in step S1907, the process advances to step S1908, whereas when a user has not selected a candidate, the process advances to step S1909. In step S1908, the candidate selected in step S1907 is applied as the exception setting for the record length, and the process advances to step S1909. In step S1909, it is determined whether or not the setting has been ended. When it is determined that an end button 1701*c* as exemplified in FIG. 17 has been depressed, the process advances to step S906 shown in FIG. 11. When it is determined that the end button 1701*c* has not been depressed, the process returns to step S1901. In step S908 shown in FIG. 11, it is determined whether or not the HFM 603 has performed end processing. When end processing performed by the HFM 603 has been indicated by depressing an end button on the UI screen, the processing of the programs is ended. When end processing has not been indicated, the process returns to step S905.

According to the second embodiment, a different exception setting may be made for each record length even when data having different record lengths is mixed in one job. The exception setting can be registered for each record length, and thus, a user can make a plurality of exception settings in one job. With this arrangement, a print processing system that is also available for VDP data having a variable record length may be realized.

Third Embodiment

Next, a description will be given of a third embodiment of the present invention. In third embodiment, the exception setting can be registered in advance for each record length, and the exception setting adapted to the record length is applied. When the exception setting for an appropriate set length is absent in the registered exception settings, a setting UI screen is presented to a user.

Figure 18:
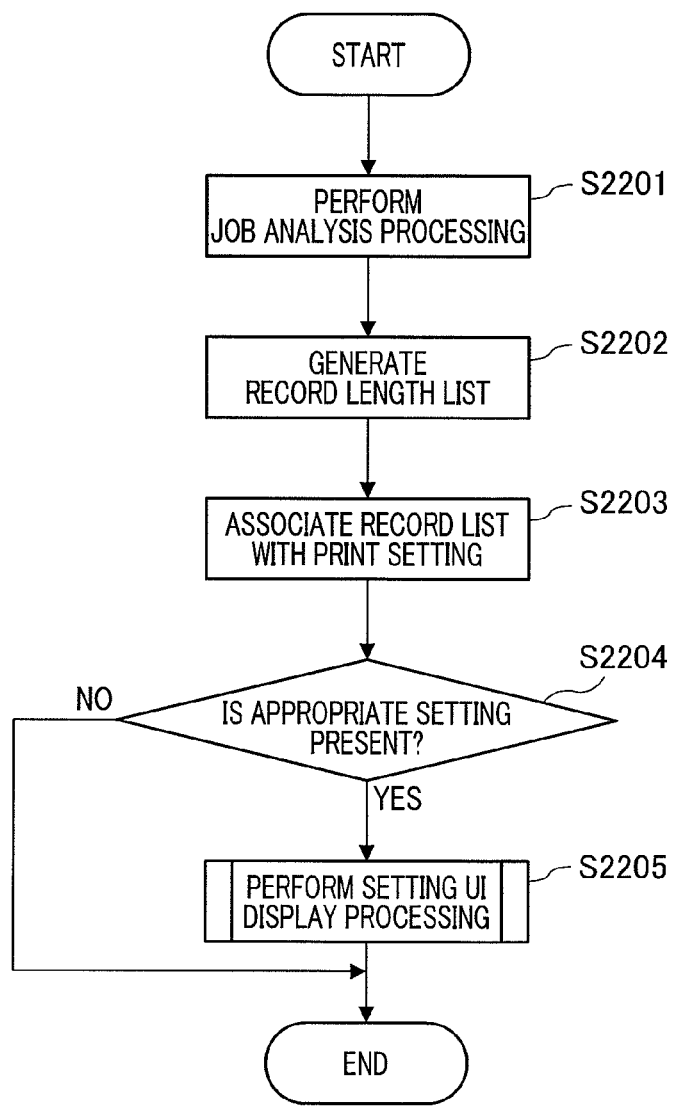
FIG. 18 is a flowchart illustrating an example of confirmation processing of the correspondence between a record length and an exception setting in order to explain a third embodiment of the present invention in conjunction with FIGS. 19 and 20.

In the third embodiment, the processing shown by the flowchart in FIG. 18 is inserted immediately after step S905 in FIG. 5 described in the first embodiment.

In step S2201, a job is analyzed. In step S2202, a record length list is generated. The processing in step S2201 is the same as that in step S1403 shown in FIG. 11, and the processing in step S2202 is the same as that in step S1404 shown in FIG. 11, and the detailed explanation thereof will be omitted. In step S2203, the operation information setting unit 602 associates the record length list analyzed in step S2202 with the registered exception settings. In other words, information suitable for the record length is selected from the registered exception setting information. In step S2204, it is determined whether or not a record not corresponding to the exception setting is present as a result of association in step S2203. Here, when it is determined that an appropriate setting is absent, the process advances to step S2205, whereas when it is determined that an appropriate setting is present, the process advances to step S906 shown in FIG. 5.

Figure 19:
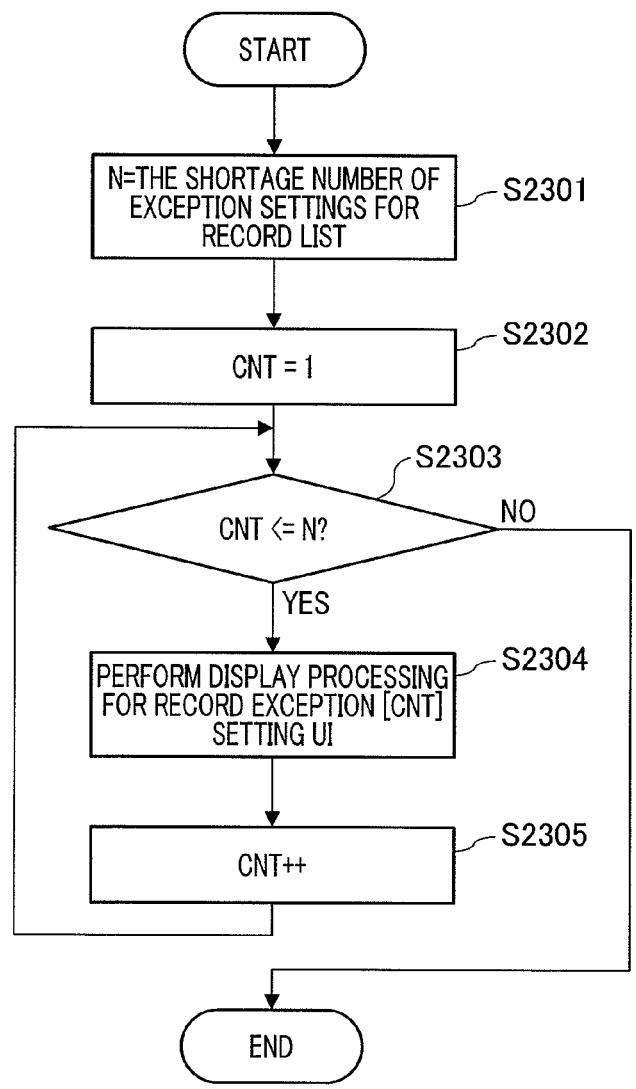
FIG. 19 is a flowchart illustrating an example of display processing for a record exception setting.
Figure 20:
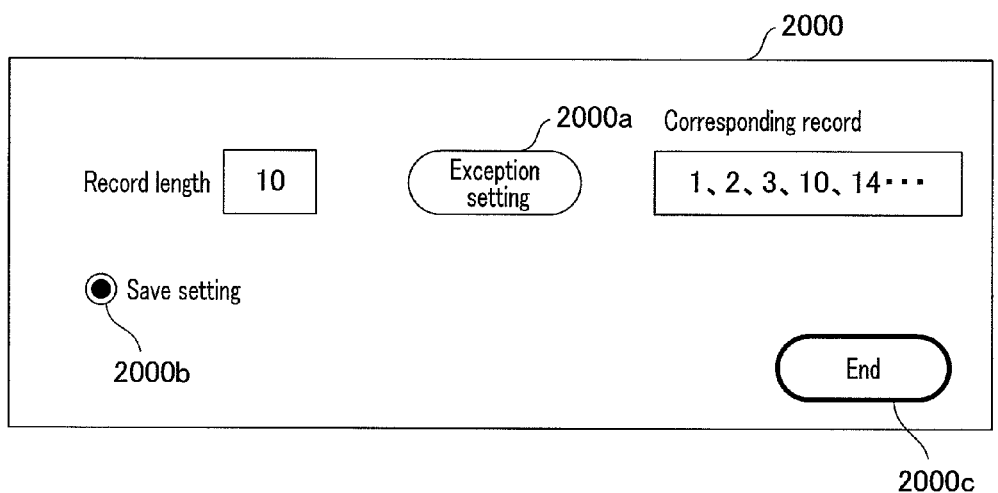
FIG. 20 is a diagram illustrating an example of a setting screen.

In step S2205, the setting UI screen is displayed so as to prompt a user to make a setting. FIG. 19 is a flowchart illustrating the details of the processing. In step S2301, the number of record lengths, which has not been associated with the registered exception settings in step S2203 shown in FIG. 18, is set to a variable N. In step S2302, the value of the count variable CNT is initialized to one. In step S2303, it is determined whether or not processing has been executed a number of times indicated by the variable N set in step S2301, and the CNT value is compared with the N value. When the CNT value exceeds the N value, the process advances to step S906 shown in FIG. 5. When the CNT value is equal to or lower than the N value, the process advances to step S2304. In step S2304, an UI screen for the exception setting is displayed in accordance with the instruction given by the operation information setting unit 602. In other words, the UI screen for the exception setting is displayed for a record length for which the exception setting is unset. An exemplary UI screen is shown in FIG. 20. In the present embodiment, a record length and a record corresponding thereto are displayed on a screen 2000, and an exception setting button 2000*a*, a setting storage button 2000*b*, and an end button 2000*c* are presented to a user. With this arrangement, a user can make the exception setting corresponding to the displayed record length. Also, a user operates the setting storage button 2000b, and thus, the exception setting information set on the UI screen may be stored for reuse upon next printing. In step S2305, the CNT value is incremented by one, and the process returns to step S2303.

According to the third embodiment, a match between the preset exception setting and the record length may be examined so as to prompt a user to make a setting by providing a setting UI screen. In other words, when exception setting information having a matched record length is absent in record exception setting information which is registered in advance, an information processing apparatus displays a setting UI screen to prompt a user to make a setting. With this arrangement, the occurrence of printing failure due to a user's setting mistake may be prevented.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-246392 filed Nov. 2, 2010 which is hereby incorporated by reference herein in its entirety.

What is claimed is:

1. An information processing apparatus comprising:
a receiving unit configured to receive a print job having a plurality of records;
a specifying unit configured to specify the number of pages included in each of the plurality of records;
a classifying unit configured to classify records having a first number of pages in the plurality of records into a first group, and classify records having a second number of pages in the plurality of records into a second group, based on the specified number of pages, wherein a plurality of records, which are included in the print job and for which the number of pages are the same, are classified in a same group;
a display configured to provide a screen including records classified into the first and second groups; and
a setting unit configured to set print setting information about the first and second groups respectively, wherein the same print setting information is set to the plurality of records in the same group.

2. The apparatus according to claim 1, wherein the specifying unit recognizes each of the plurality of records by detecting a DOC tag included in the print job, and recognizes the number of pages in each of the plurality of records by detecting a Page tag in each of the plurality of records.

3. The apparatus according to claim 1, wherein the screen has a first button for setting exception setting information for one of the plurality of records, and a second button for using the exception setting information for the other records of the plurality of records.

4. A control method executed by a processing apparatus, comprising:
receiving a print job having a plurality of records;
specifying the number of pages included in each of the plurality of records;
classifying records having a first number of pages in the plurality of records into a first group, and records having a second number of pages in the plurality of records into a second group, based on the specified number of pages, wherein a plurality of records, which are included in the print job and for which the number of pages are the same, are classified in a same group;
providing a screen including records classified into the first and second groups; and
setting print setting information about the first and second groups respectively, wherein the same print setting information is set to the plurality of records in the same group.

5. The method according to claim 4, wherein the specifying step recognizes each of the plurality of records by detecting a DOC tag included in the print job, and recognizes the number pages in each of the plurality of records by detecting a Page tag in each of the plurality of records.

6. The method according to claim 4, wherein the screen has a first button for setting exception setting information for one of the plurality of records, and a second button for using the exception setting information for the other records of the plurality of records.

7. A non-transitory storage medium on which is stored a computer program for making a computer execute a method for controlling a processing apparatus, the method comprising:
receiving a print job having a plurality of records;
specifying the number of pages included in each of the plurality of records;
classifying records having a first number of pages in the plurality of records into a first group, and records having a second number of pages in the plurality of records into a second group, based on the specified number of pages, wherein a plurality of records, which are included in the print job and for which the number of pages are the same, are classified in a same group;
providing a screen including records classified into the first and second groups; and
setting print setting information about the first and second groups respectively, wherein the same print setting information is set to the plurality of records in the same group.

8. The non-transitory storage medium according to claim 7, wherein the specifying step recognizes each of the plurality of records by detecting a DOC tag included in the print job, and recognizes the number pages in each of the plurality of records by detecting a Page tag in each of the plurality of records.

9. The non-transitory storage medium according to claim 7, wherein the screen has a first button for setting exception setting information of one of the plurality of records, and a second button for using the exception setting information of the other records of the plurality of records.

* * * * *